UNITED STATES PATENT OFFICE.

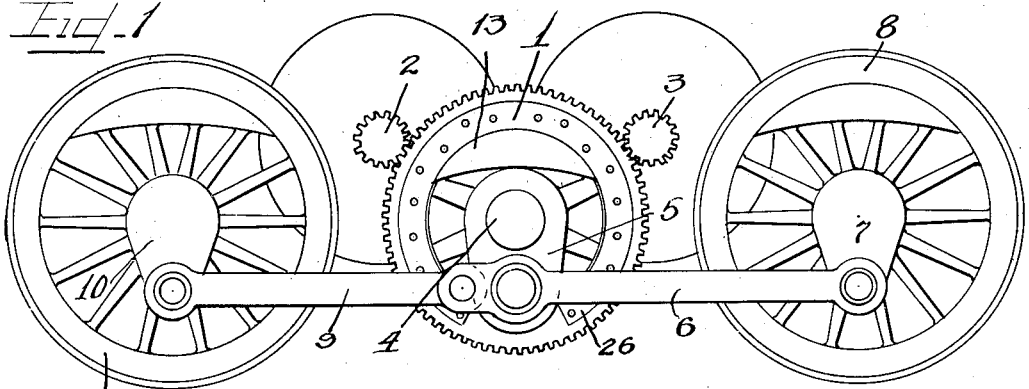
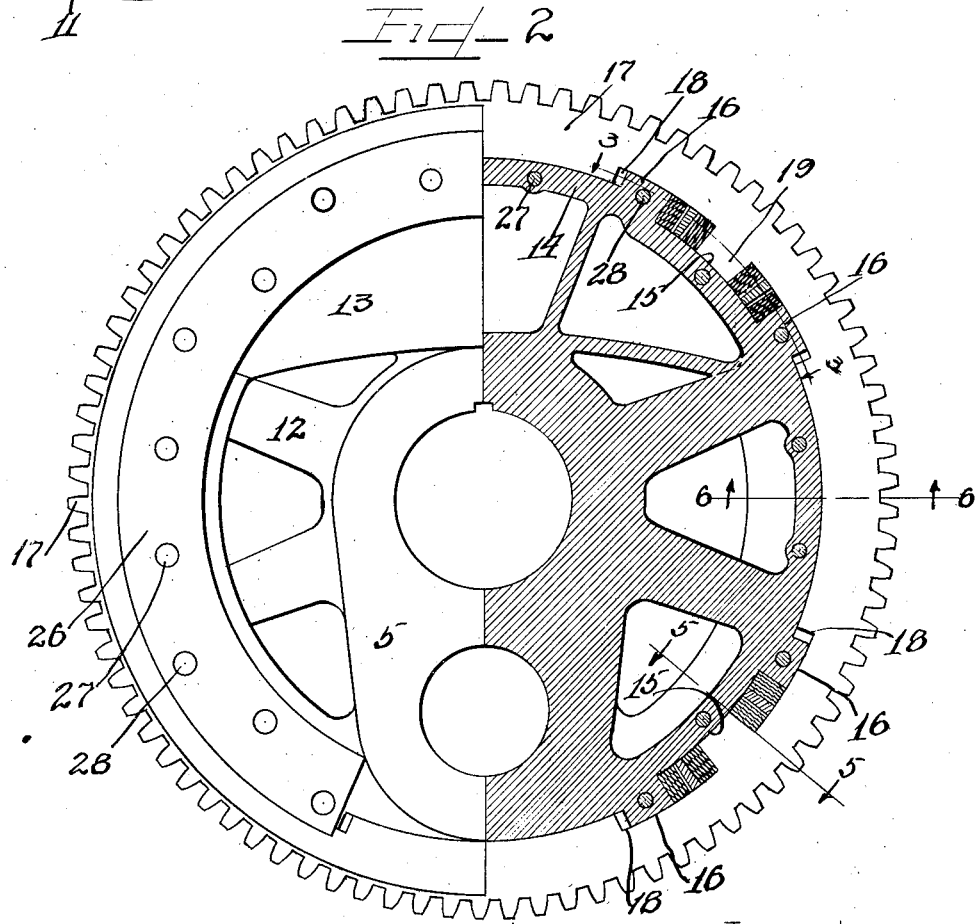

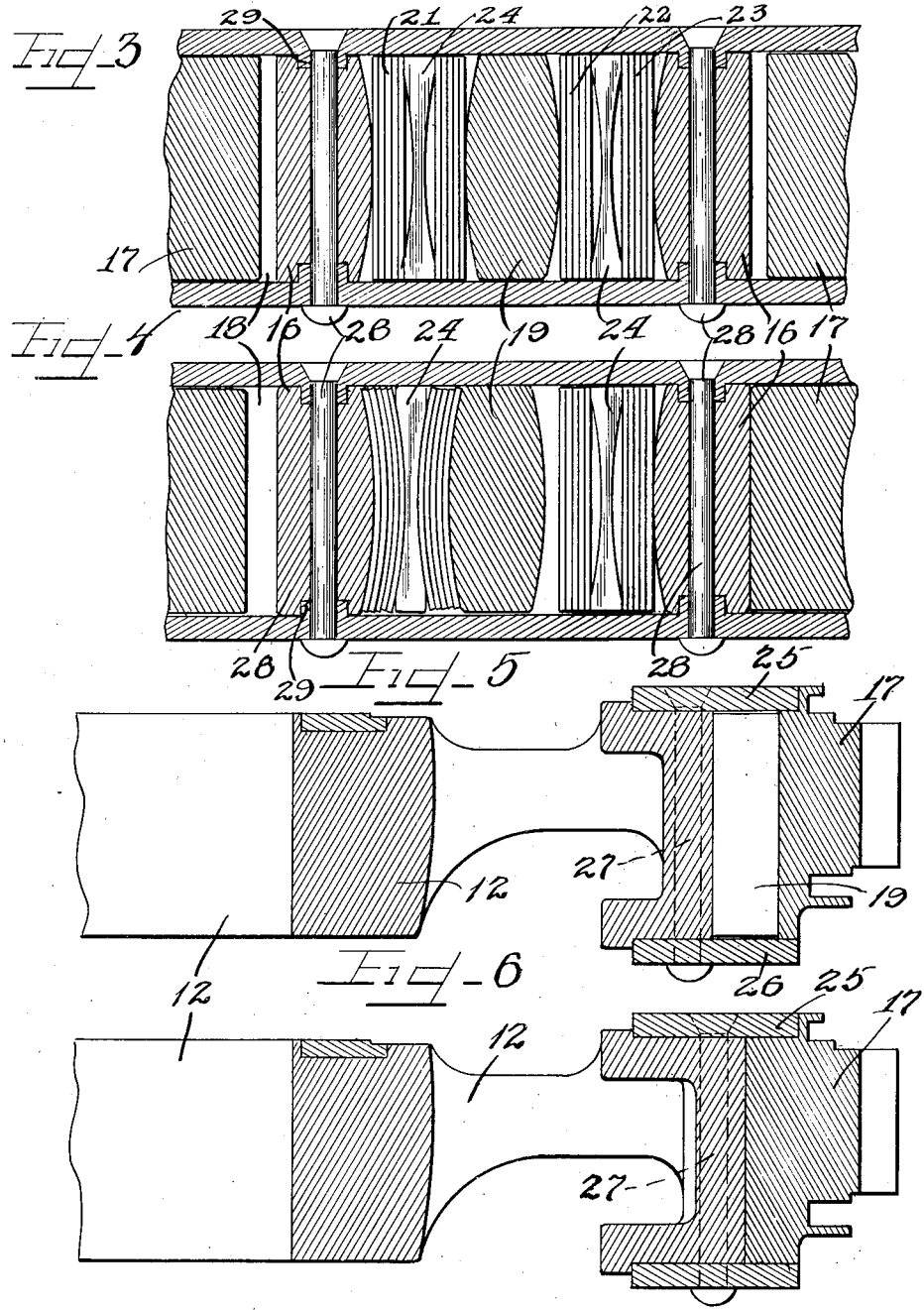

JAMES MILTON WAUGH, OF CHICAGO, ILLINOIS.

RESILIENT TRANSMISSION-GEAR.

1,382,698.   Specification of Letters Patent.   Patented June 28, 1921.

Application filed October 10, 1919.  Serial No. 329,709.

*To all whom it may concern:*

Be it known that I, JAMES MILTON WAUGH, a citizen of the United States, and a resident of the city of Chicago, in the county of Cook and State of Illinois, have invented certain new and useful Improvements in a Resilient Transmission-Gear; and I do hereby declare that the following is a full, clear, and exact description of the same, reference being had to the accompanying drawings, and to the numerals of reference marked thereon, which form a part of this specification.

This invention relates to an improved construction of resilient motor-drive, transmission gear particularly adapted for heavy duty as for instance in use upon electric locomotives.

It is an object therefore of this invention to construct a resilient type of transmission gear adapted for heavy duty wherein the wheel proper and a separate rim are capable of a limited relative movement, and with heavy duty shock-absorbing friction plate spring mechanisms between the two to receive and transmit driving stresses therebetween.

It is also an object of this invention to construct a resilient driving gear for use in a power transmission whereby driving stresses between the driving and driven elements of the construction are yieldably applied through the gear, and impact and load shocks absorbed so that a smooth and even application of power is assured with greatly increased ease and efficiency of operation of the driving elements.

Other and further important objects of the invention will be apparent from the disclosures in the drawings and specification.

The invention (in a preferred form) is illustrated in the drawings and hereinafter more fully described.

Drawings.

Figure 1 is an elevation illustrating diagrammatically the adaptation of a gear embodying the principles of my invention to the drive mechanism of a locomotive.

Fig. 2 is an enlarged face view of the resilient gear partly broken away and shown in section.

Fig. 3 is a section detail on line 3—3 of Fig. 2.

Fig. 4 is a similar view with the parts shown in an extreme position of adjustment.

Fig. 5 is a sectional detail taken on line 5—5 of Fig. 2.

Fig. 6 is a sectional detail taken on line 6—6 of Fig. 2.

Description.

In the diagrammatic view shown in Fig. 1, the transmission gear is denoted as a whole by the reference numeral 1, and is meshed by two driving pinions 2 and 3 respectively. The said gear 1 is mounted upon a shaft 4 and integral with said gear, is a crank 5. Journaled on the shaft of the crank 5 is a connecting rod 6, which is also journaled on the crank 7 of a drive wheel 8, and another connecting rod 9 is journaled on the end of the connecting rod 6 and on the crank 10 of another driving wheel 11.

The resilient transmission gear consists of an interior wheel 12, the crank portion 5 of which is integral therewith and said wheel is provided with a counter-weight 13 to balance the crank 5 and connecting rods 6 and 9 against centrifugal effects. Said wheel 12 has an integral rim 14, and formed substantially equidistantly therearound and four in number, are pockets 15, although the exact number thereof is immaterial, as clearly the number may be varied. At the ends of each of the pockets 15, lugs or abutments 16 are formed, extending beyond the periphery of the rim 14. Fitted over the wheel rim 14 is a rim or gear ring 17 which has pockets 18 cored therein and with a central abutment 19 midway between the ends of each of the pockets 18. The pockets 18 are longer than the extreme distance between the ends of the respective pairs of abutments 16 so that there is a slight lost motion permissible between the gear ring 17 and the wheel rim 14.

Fitted transversely in the pockets 16 and interposed between the respective abutments 16 and 19, are a plurality of groups of spring friction plates denoted respectively by the reference numerals 21, 22 and 23. Disposed between each group on each side of the central abutments 19, are double concave movable abutment plates 24.

Means are provided for retaining the ring gear 17 upon the rim 14 of the wheel 12, and, as clearly shown in Figs. 5 and 6, retaining rings or ring plates 25 and 26 respectively are provided of almost complete circular form seating into recessed portions of said respective ring gear 16 and wheel rim 14 and held connected to one another in assembled relation on the wheel and the gear by means of bolts or other means 27 and 28 respectively. The bolts 27 pass through the wheel rim 14 and the bolts 28 extend through the abutments 16. As clearly shown in Figs. 3 and 4, said ring plates 25 and 26 are provided with boss extensions 29 which interfit with recesses provided therefor in the wheel rim and wheel rim abutment respectively, and through which said bolts 27 and 28 extend. Thus said bolts are relieved of any shearing stress due to a tendency for movement of the ring plates with reference to the wheel 12. Said ring plates 25 and 26 contact the side surfaces of the ring gear 17 and retain the same in place upon the wheel rim 14.

Operation.

In this transmission gear, either the ring gear 17 or the wheel 12 may be the driving or driven element, but in the first instance shown as illustrated in Fig. 1, the ring gear 17 is a driving element and is driven by the pinions 2 and serves to drive the wheel 12.

When the driving stress is imparted to the ring gear 17, for instance, tending to rotate the same counter clockwise, the central abutment 19 of each group of resilient spring friction plates compresses the respective groups of spring friction plates 20 and 21 from normal position such as shown in Fig. 3 to a bent position shown in Fig. 4, provided that the load resisting the driving stress is sufficient to effect an extreme movement of the parts. Thus the drive imparted to the wheel 12 is applied yieldably from the source of power through the transmission gear 1 as flexing of the spring friction plates and relative movement between the ring gear 17 and wheel 12 takes place.

The operation of the group of friction plates when flexed under a driving stress is different from that of springs or other ordinary resilient mechanisms. The plates form an admirable means of transmitting heavy loads and absorbing impacts due to loads suddenly applied. This is due to the fact that the size and number of the plates determines the frictional area therebetween, and the friction between the plates operates as a retarding effect to the movement of the resilient means. The friction between the plates has a retarding effect to resist flexing of the plates, both under lead or impact and again when the load is relieved. In the second instance the friction acts to prevent a sudden recoil action of the resilient plates. As a consequence, a yielding driving connection is provided between the driving and driven elements of the gear, and the shocks occurring are absorbed and dissipated by the friction plate resilient members. All of the parts are inclosed and protected from tampering or injury, and there is no necessity for opening the structure by the removal of the ring plates. The plates need no lubricant and will operate for indefinite periods without requiring attention or inspection.

I am aware that many changes may be made, and numerous details of construction may be varied through a wide range without departing from the principles of this invention, and I therefore do not purpose limiting the patent granted hereon otherwise than necessitated by the prior art.

Claim.

A power transmission element comprising a wheel, a plurality of pockets therein, a rim movably mounted on said wheel, abutments on said wheel and rim adapted to contact one another in extreme positions of adjustment to limit the extent of lost motion between the wheel and rim, a plurality of groups of resilient friction plates mounted within said wheel pockets to resist displacement of said wheel and rim relative to one another, and projections on said rim adapted to project between the groups of friction plates in said pockets to afford a yieldable driving connection between said wheel and rim.

In testimony whereof I have hereunto subscribed my name in the presence of two subscribing witnesses.

JAMES MILTON WAUGH.

Witnesses:
  LAWRENCE REIBSTEIN,
  FRED E. PAESLER.